United States Patent [19]
Prescott

[11] 3,717,162
[45] Feb. 20, 1973

[54] CASCADE CONTROL SYSTEM
[75] Inventor: Robert C. Prescott, Foxboro, Mass.
[73] Assignee: The Foxboro Company, Foxboro, Mass.
[22] Filed: July 19, 1971
[21] Appl. No.: 163,951

[52] U.S. Cl.............137/14, 137/DIG. 1, 137/82, 137/84, 137/86, 236/82
[51] Int. Cl.............................................F15b 5/00
[58] Field of Search.............137/DIG. 1, 14, 84, 86; 236/82

[56] References Cited

UNITED STATES PATENTS

| | | | |
|---|---|---|---|
| 2,969,080 | 1/1961 | Mamzic | 137/84 |
| 3,126,903 | 3/1964 | Hart et al. | 137/84 |

*Primary Examiner*—Alan Cohan
*Assistant Examiner*—Gerald A. Michalsky
*Attorney*—Bryan, Parmelee, Johnson & Bollinger

[57] ABSTRACT

A pneumatically operated cascade control system comprising a primary controller producing an output signal as the set point for a cascaded secondary controller which controls the setting of a process valve. The secondary controller incorporates planar pneumatic technology wherein a thin sheet or plate of metal is formed with openings to define pressure-receptive segments which are pivotable about pivot axes at selected regions. This plate forms part of a laminar sandwich having wall means which cooperate with the plate segments to define pressure chambers to some of which various pressure signals are directed to cause the plate segments to pivot about their pivot axes. Output pressure signals are derived from other of the pressure chambers. The cascade control system comprises transfer switching means for transferring between automatic and manual modes in a bumpless, balanceless fashion. All of the controls required by the process operator are available at the front panel of the instrument, while additional controls for the specialized purposes of maintenance personnel are located in the interior of the instrument with restricted availability.

26 Claims, 15 Drawing Figures

Fig. 2A

CASCADE CONTROL SYSTEM

BACKGROUND OF THE INVENTION

1. Field of the Invention

This invention relates to industrial process instrumentation, and particularly to control apparatus of the type commonly referred to as cascade control systems. Such cascade control apparatus consists basically of two separate controllers, typically referred to respectively as the primary (or master) controller, and the secondary (or slave) controller. Each controller is supplied with a measurement signal representing a corresponding process condition. For example, the primary controller might receive a temperature measurement signal representing the output temperature of a process heat-exchanger, while the secondary controller might receive a flow measurement signal representing the fuel flow rate into the burner supplying heat to the exchanger.

The purpose of a cascade control system is to maintain the primary variable (e.g. output temperature) at a set level. To this end, the output of the primary controller furnishes the set point signal for the secondary controller. Incorporation of the cascaded secondary controller in the control loop provides improved performance in achieving this result.

2. Description of the Prior Art

Cascade control systems have been in commercial use for many years, in a variety of forms. One serious problem with cascade control systems is that of switching between automatic and manual modes of operation, in a bumpless, balanceless fashion, i.e. without requiring any intermediate "balancing" operation during the switchover procedure. The problem of switching from manual to automatic operation has presented a particularly difficult problem due to the complexity of the overall system, i.e. wherein there are two separate controllers each of which must be prevented from introducing any upset or "bump" in the process at the time of switchback to automatic mode.

It has been found preferable to mount the primary and secondary controllers as a physically integrated unit, i.e. as a so-called "single-station" cascade controller. A practical difficulty in achieving this result in a pneumatic control system stems from the fact that ordinary pneumatic controllers are relatively large in size, so that the overall package which includes two separate conventional pneumatic controllers can be excessively bulky for modern control station arrangements.

SUMMARY OF THE INVENTION

In the preferred embodiment to be described hereinbelow in detail, a cascade control system of the pneumatic type is provided wherein both the primary and secondary controllers are mounted together as a single-station cascade controller. The primary controller in this embodiment is essentially a known pneumatic controller having constructional arrangements and operational capabilities similar to previously used equipment such as is disclosed in U.S. Pat. Nos. 2,724,917 and 3,515,162. This primary controller produces an output pressure signal which is directed to the secondary controller as the set point signal for that controller. The specific primary controller disclosed is of the three-mode type, including proportioning, reset and rate functions, but it will be apparent that the system will operate with other types of primary controllers. The secondary controller disclosed is a two-mode unit, providing proportioning and reset functions, but other types of secondary controllers also can be used in the system of the present invention.

When the system is conditioned for manual operation, the valve signal is controllable directly from the front panel of the station, and both the primary and secondary controllers are effectively eliminated from the controlling function. The transfer switching arrangement for making the shift from automatic to manual operation is similar in important conceptual respects to the apparatus disclosed in co-pending application Ser. No. 067,750 filed by Earl A. Beardsley et al. on Sept. 1, 1970, and accordingly information on certain details of the present apparatus can be obtained by reference to that co-pending application. In brief, however, the present equipment includes a pneumatically-operated servo position-follower, which, while the system is in automatic mode, continuously adjusts the manual signal control lever to a position corresponding to the automatic valve signal being directed to the process valve. Thus, upon switchover from automatic to manual, the manual unit will produce a valve signal exactly equal to the previously existing automatic control signal, thereby avoiding any "bump" of the process valve.

For switchback from manual mode to automatic mode, a distinctive arrangement is used to assure bumpless transfer, still without requiring any intermediate operational procedures such as a balancing step. In more detail, while the system is in manual mode, it is maintained in readiness for one-step transfer back to automatic mode by means which (1) continuously holds the output of the secondary controller equal to the manual signal, and (2) simultaneously maintains the primary and secondary controllers in appropriate conditions to avoid upsetting the process upon switchback to automatic, and accomplishes this without requiring a primary set-point change.

In the preferred embodiment, this latter result is achieved in part by continuously adjusting the primary reset pressure to maintain it at a value which produces a primary output signal equal to the secondary measurement signal, and by continuously adjusting the secondary reset pressure (through a non-restrictive, bypass channel) to be equal to the manual valve signal. With this arrangement, the primary and secondary controllers will be continuously maintained in condition to avoid upsetting the process both during and after switchback to automatic mode.

In effect, the primary controller will, when the system is in manual mode, be conditioned to "call" for the secondary variable magnitude (e.g. flow rate) which is currently being produced by the manually-set valve position. Thus the primary controller conditions the secondary controller so that it can "call" for the actual existing valve position.

After switchback to automatic, the control system will, if there is any deviation between the primary measurement and set signals (as there is likely to be), cause the valve to be repositioned to whatever extent might be necessary to bring the primary measurement signal back to the primary set point. This latter control action will however be effected smoothly, without a step change due to proportioning action, and the response dynamics will be in accordance with the already established control settings of proportioning, derivative and reset.

The secondary controller, in the preferred embodiment to be described, is based upon certain aspects of the planar pneumatic technology which has been disclosed in U.S. Pat. Nos. 3,590,694 and 3,593,734. Such planar technology has, however, been further extended in this new controller by novel features to be described hereinbelow. The resulting controller provides advanced operational capabilities yet is quite small relative to conventional controllers. Such features have contributed significantly to the achievement of a commercially practical, single-station pneumatic cascade system combining both the primary and secondary controllers in a unitary instrument casing of standard dimensions.

Accordingly, it is a principal object of the present invention to provide improved apparatus and methods suited for controlling industrial processes. A more specific object of the invention is to provide a superior cascade control system having unique means for transferring from manual to automatic operation. Still another object of the invention is to provide improved pneumatic signal-handling means of the planar type, capable of extending the capabilities of such apparatus into new areas. Other objects, aspects and advantages of the invention will in part be pointed out in, and in part apparent from, the following description considered together with the accompanying drawings in which:

FIG. 2D shows the manner in which FIGS. 2A, 2B and 2C are joined to present the complete circuit;

Figures 1, 2A:
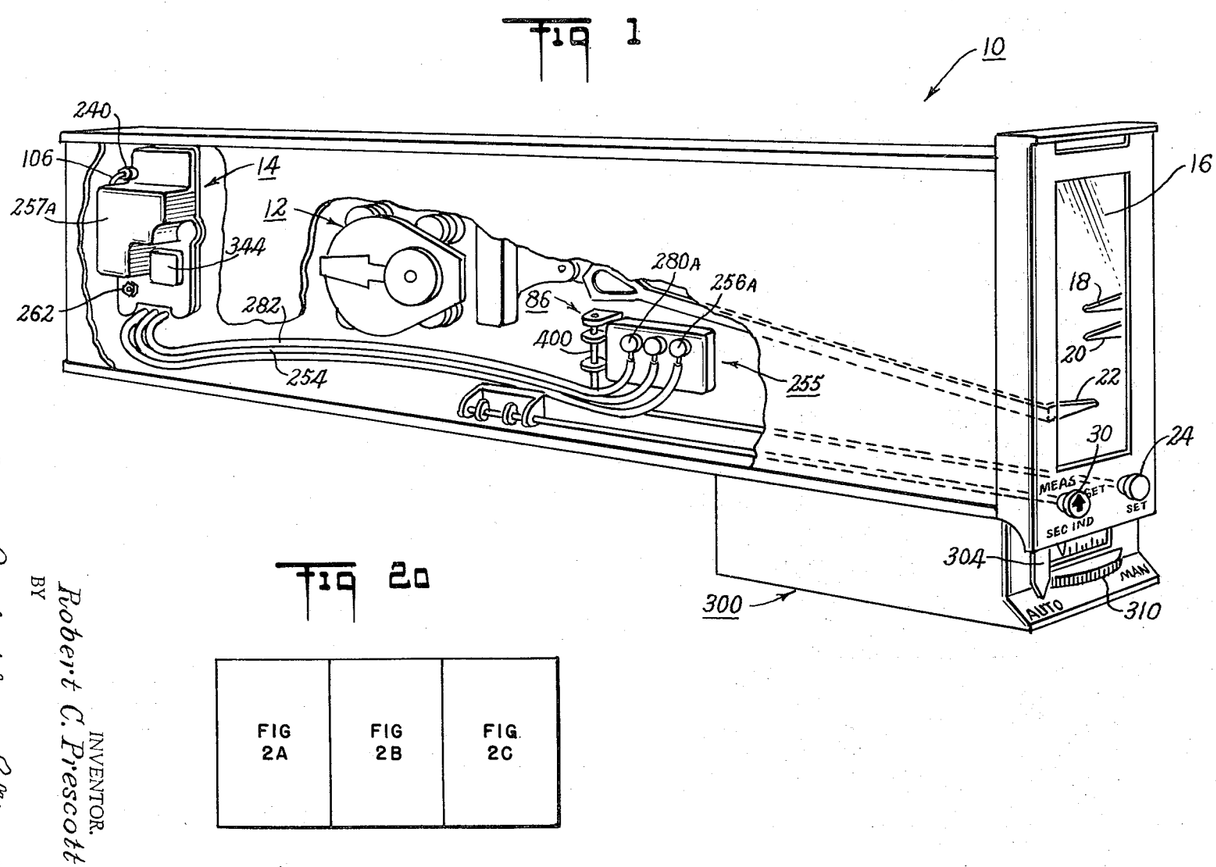
FIG. 1 is a perspective view, partly cutaway, of a single-station pneumatic cascade controller in accordance with this invention.
FIGS. 2A, 2B and 2C together present a schematic diagram showing the overall pneumatic circuit of the cascade control system, partly in perspective, and partly pictorial.

Referring now to FIG. 1, the cascade control apparatus comprises an instrument casing 10 within which is mounted a primary pneumatic controller, illustrated partially at 12 as a force-balance unit of known construction, together with a secondary pneumatic controller 14 of unique construction to be described hereinbelow. The primary controller is of the so-called three-mode type, providing the control functions referred to as proportioning, reset and rate. The secondary controller is a two-mode type, providing proportioning and reset.

At the front of the instrument there is an indicator scale 16 having three separate pointers 18, 20, 22. One of these pointers 18 serves to indicate the primary set point level (e.g. a desired temperature), and is manually adjustable from the front panel by means of the usual knob 24. The second pointer 20 indicates the actual measured value of the primary condition, for ready comparison with the set point level.

The third pointer 22, extending in from the left-hand side of the front panel scale, normally indicates the measured value of the secondary condition (e.g. rate of fuel flow into a heat exchanger). However, for operator convenience, this pointer can alternatively be used to indicate the value of the secondary controller set point (i.e. the output of the primary controller). A two-position knob 30 is provided at the front panel to permit the operator to shift the indicator between these two shared functions.

Figure 2A:
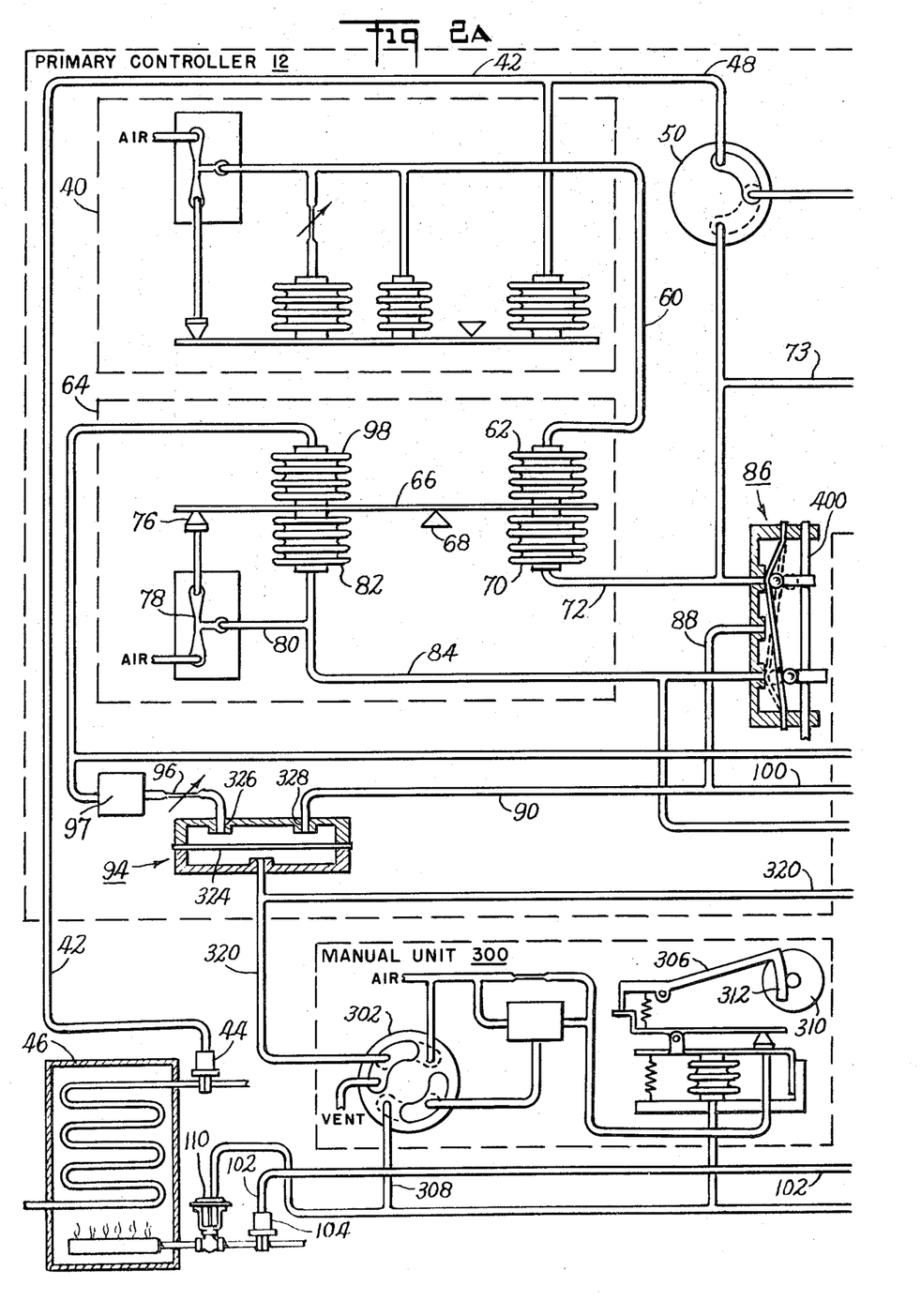
Figure 2B:
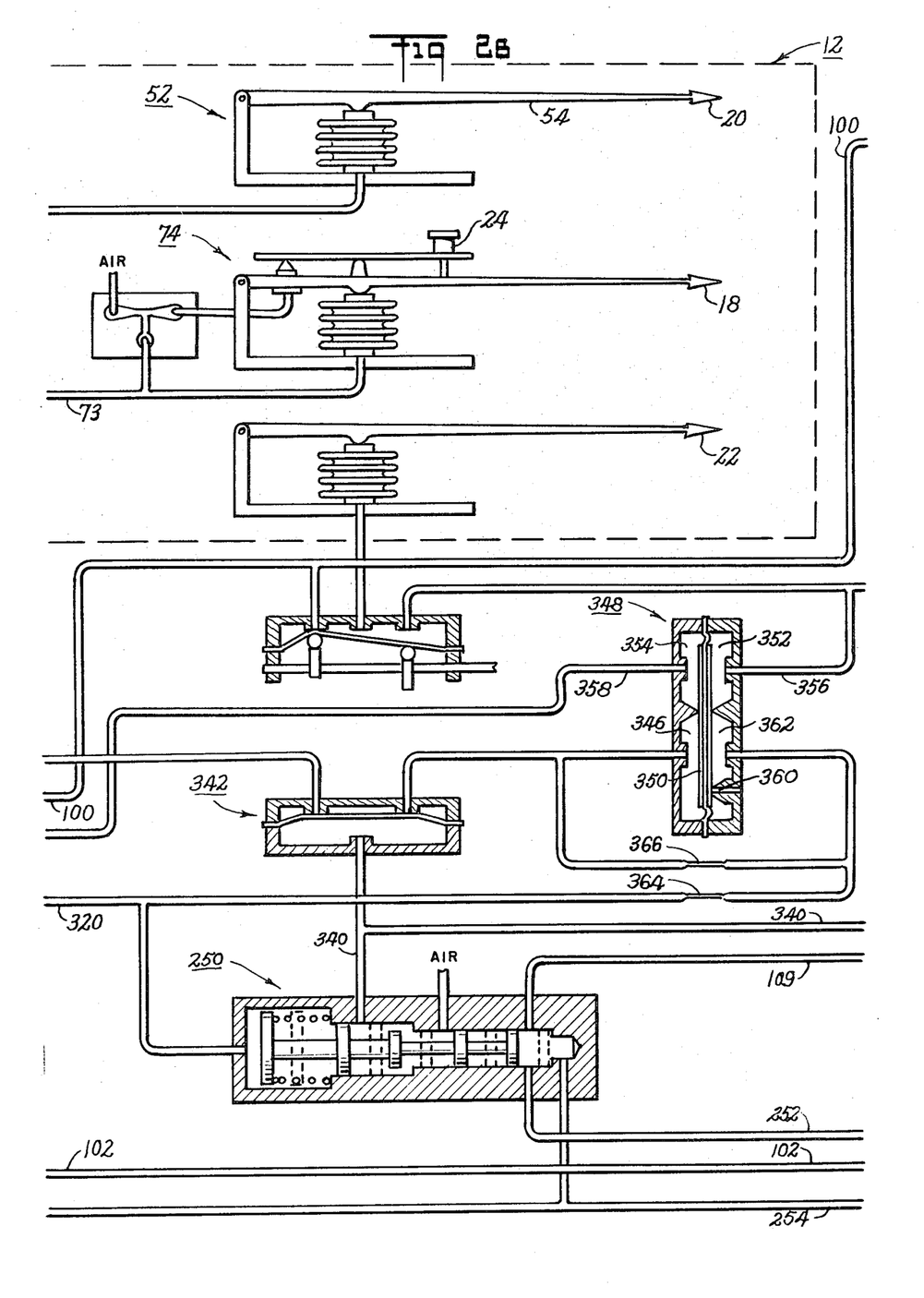
Figure 2C:
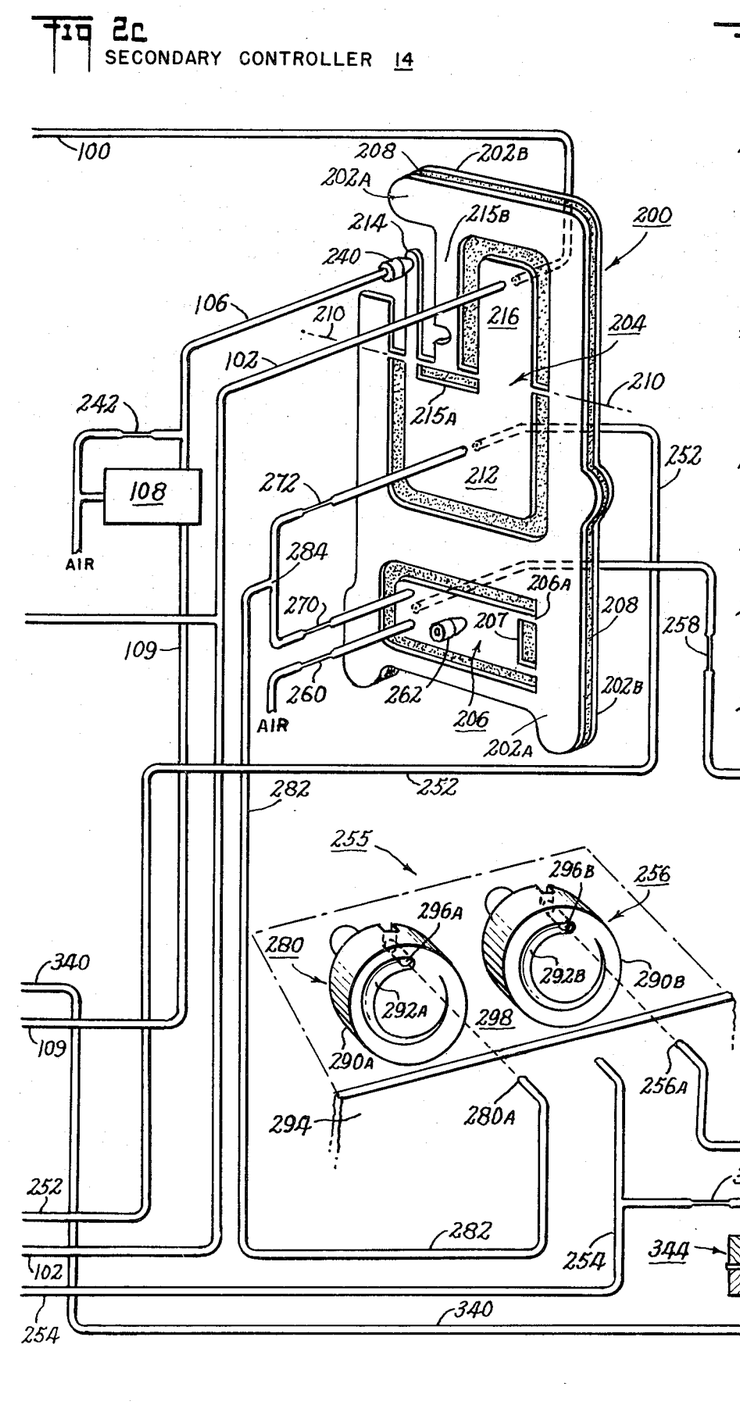
Figure 3A:
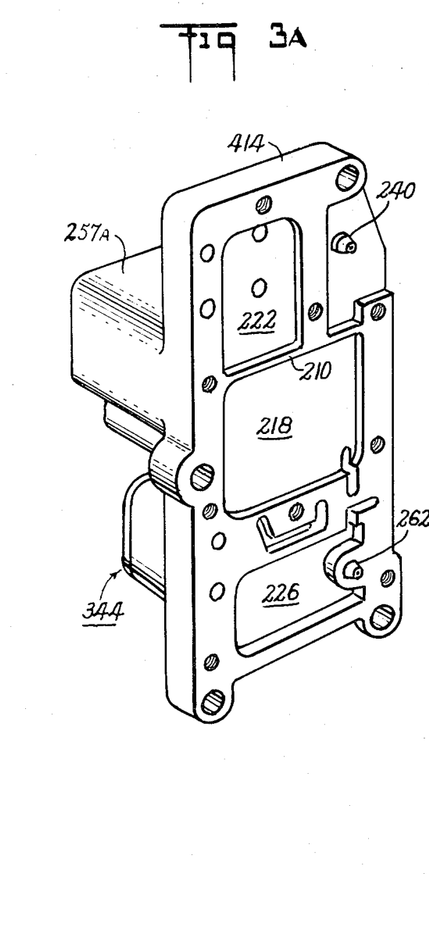
FIGS. 3A through 3I show in perspective individual layers of the planar pneumatic construction utilized in the secondary controller.
Figure 3B:
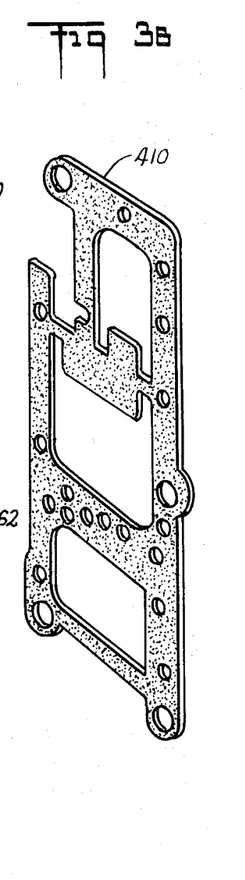
Figures 3C, 3D:
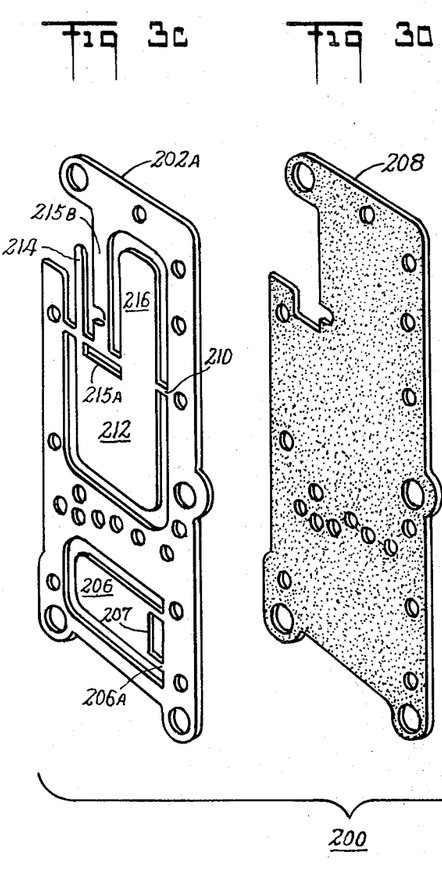
Figure 3E:
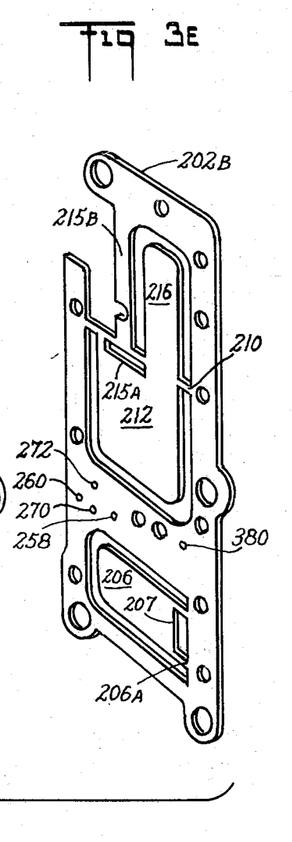
Figure 3F:
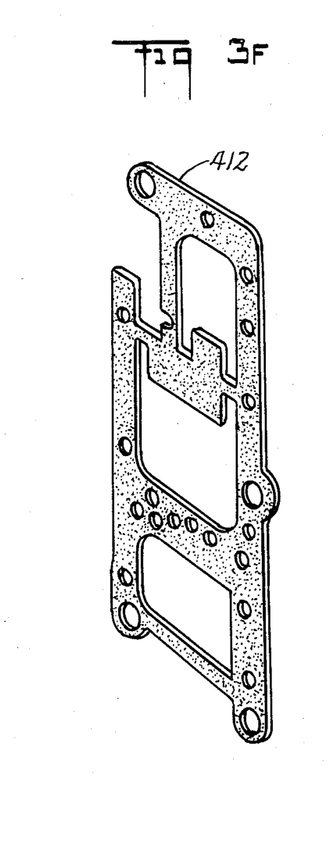
Figure 3G:
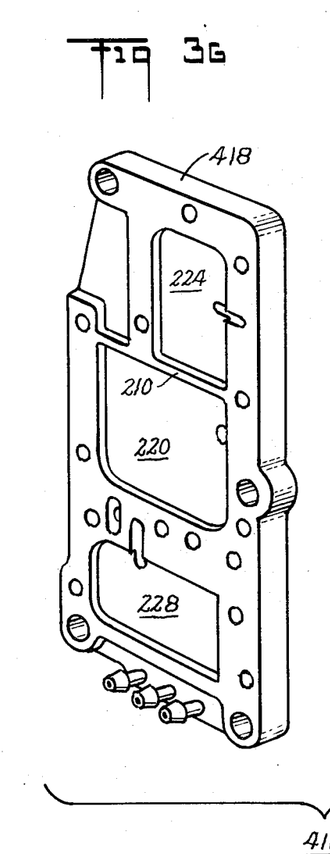
Figure 3H:
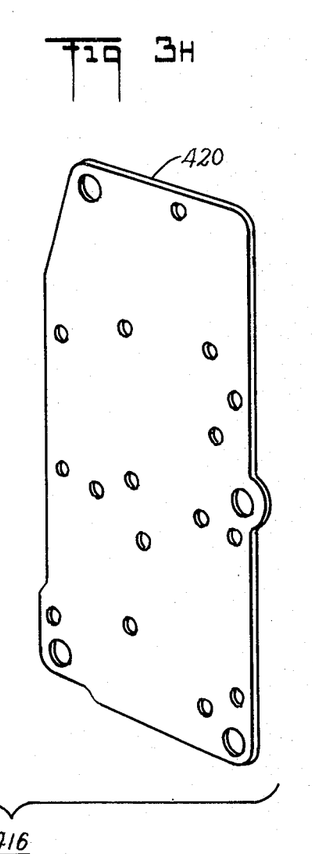
Figure 3I:
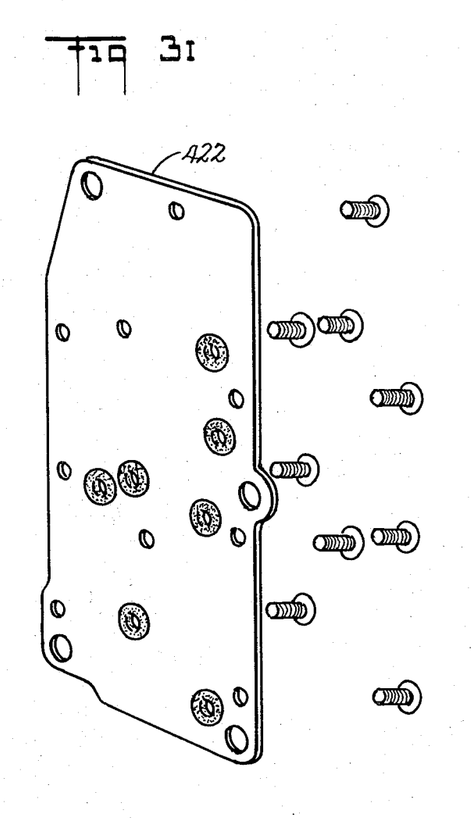

FIGS. 2A, 2B and 2C when joined together as outlined in FIG. 2D, show in schematic circuit form the overall arrangement of the cascade control system. Referring first to FIG. 2A, the primary controller 12 includes an initial derivative or "rate" unit 40 of the force-balance type which receives from a conduit 42 the primary measurement signal in the form of a pneumatic pressure representing the magnitude of the primary condition to be controlled. Such primary measurement signal is produced by any conventional measurement instrument of transducer, such as a temperature measuring instrument illustrated at 44 in association with an exemplary heat-exchanger process 46. This measurement signal in conduit 42 also is directed through another conduit 48 and a transfer valve 50 to a pneumatic bellows-type receiver 52 of known construction. This receiver actuates an output linkage 54 which positions the measurement pointer 20 (see also FIG. 1) at the front panel of the instrument.

The output signal from the derivative unit 40 is directed through a conduit 60 to the input or measurement bellows 62 of a four-bellows pneumatic force-balance unit 64 of known construction, illustrated (for simplicity) with a balance beam 66 pivoted at 68. This beam is arranged to receive at its right-hand end the forces developed by the measurement bellows 62 and an opposed set point bellows 70. This set bellows 70 receives a set point pressure signal from conduits 72 and 73 leading to a set-point transmitter 74 (FIG. 2B) of known construction, controlled by the front panel knob 24 previously referred to.

Any unbalance in the forces applied to the balanceable beam 66 by the measurement and set bellows is detected by the usual pneumatic nozzle 76 supplied with air through a flow restrictor 78, such as the aspirator arrangement described in U.S. Pat. No. 3,574,486.

As is well known, the back pressure of this nozzle 76 is a function of the position of the beam 66, and this pressure is supplied directly through a conduit 80 to a negative feedback bellows 82 which applies a corresponding force to the left-hand end of the beam. The nozzle back pressure also is directed through a pneumatic reset circuit which, in this embodiment, includes a conduit 84, a manually-operable transfer switch 86 (the function of which will be discussed later), conduits 88 and 90, a pneumatically-controllable close-off switch 94 (the function of which also will be discussed later), an adjustable reset flow restrictor 96, and a reset tank or "volume" 97 connected to a reset bellows 98. This latter bellows is positioned to oppose the feedback bellows 82, and produces reset action in the controller output signal in known fashion. The nozzle back pressure in conduits 84, 88 serves as the output signal of the primary controller 12 and is directed through an output conduit 100 to the secondary controller 14 (FIG. 2C) to provide the set signal for that controller. Thus the primary controller output signal is in effect an "intermediate" output signal of the cascade control system.

The secondary controller 14 also receives from another input conduit 102 a pressure signal representing the secondary measurement (e.g. fuel flow rate, as in the illustrated example) developed by a conventional measuring instrument 104. The secondary controller compares these two pressure signals, in a manner to be explained, and produces an appropriate output pressure signal in a conduit 106 leading to an output relay 108 (FIG. 2C). The relatively high-powered signal of this relay is utilized to produce feedback action in the secondary controller, and also provides a final automatic output signal which is directed from the relay output conduit 109 and connecting conduits to the process valve 110 (FIG. 2A). In this embodiment, the valve is illustrated as a fuel flow control valve for the heat-exchanger process 46. (Although an actual valve is illustrated in connection with this embodiment, it is to be understood that the output signal can be used to manipulate any variable, operator, or process influencing element, and that the term "valve" therefore should be understood to broadly embrace such other types of elements.)

THE SECONDARY CONTROLLER

The secondary controller 14 incorporates, and is based upon, what has sometimes been referred to as "planar pneumatic technology." The fundamental concepts of such technology have been described in detail in U.S. Pat. Nos. 3,590,694 and 3,593,734. Briefly speaking, planar pneumatic devices are multi-layered "sandwich" structures the operating elements of which typically comprise thin metal plates pivotally or hingedly mounted for movement responsive to applied fluid pressures. The movements of such plates serve to control or regulate various pneumatic signals or the like.

The secondary controller 14 is of such a laminar construction, and the individual layers of the present embodiment are shown separately in exploded perspective in FIGS. 3A through 3I. However, to simplify the presentation and explanation of the functional operation of the controller, the schematic illustration of FIG. 2C shows only the "flexure assembly" portion 200 of the structure. This structure consists of a pair of somewhat springy but essentially form-retaining matched thin metal sheets or plates 202A, 202B provided with aligned cut-out sections or openings so as to define a multi-segmented pivotable operator 204 and an elongate element 206 hingedly supported in cantilever fashion at one end 206A.

A thin rubber sealing diaphragm 208 is secured between the two metal plates 202A, 202B. This diaphragm extends across the cut-out openings in the plates to seal off and thereby isolate the pressures on opposite sides of the flexure while permitting small movements of the pivotable operator 204 about its pivot axis 210, and similarly permitting small movements of the hinged element 206 about its cantilever support 206A. Cut-out 207 is provided to fix an appropriate springiness for such small movements of element 206.

FIG. 2C also includes pictorial representations of conduits and the like to indicate the manner in which the various parts of the controller cooperate and co-act to produce the final automatic output control signal. Not shown in FIG. 2C are the various other layers which adjoin and effectively surround the flexure assembly 200. These additional layers together serve to define sealed pressure chambers adjacent specific portions of the operator 204 and the element 206, to sealingly support the operator for pivotal movement about the pivot axis 210, and also to form numerous interconnecting passages for conducting pneumatic pressure signals between the pressure chambers and various operating parts.

Figure 4:
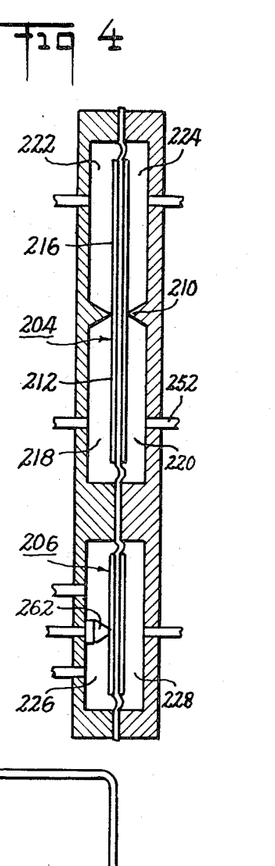
FIG. 4 is a partial vertical section showing elements of the planar pneumatic controller of FIGS. 3A through 3I.

The pivotable operator 204 comprises a relatively large-area tongue-like segment 212 below the pivot axis 210, and two smaller separate tongue-like segments 214, 216 above the pivot axis. An isolation cut-out 215A in lower segment 212 effectively avoids rigid connection between operator 204 and the adjoining outer section 215B of the flexure plates 202A, 202B, and thus accommodates the required pivotal movement of the operator. Adjoining layers of the laminar structure (referring now also to FIG. 4) define one pair of pressure chambers 218, 220 adjacent the respective opposite surfaces of the lower tongue 212, another pair of pressure chambers 222, 224 adjacent the respective opposite surfaces of the right-hand upper segment 216, and a third pair of pressure chambers 226, 228 adjacent the respective opposite surfaces of the hinged element 206.

The flexible sealing diaphragm 208 prevents air flow through the cut-out regions around the operator 204 and element 206. Thus the opposing pressure chambers are effectively sealed to permit independent pressure variations therein. The left-hand upper segment 214 extends out through the sealed pivot region 210 to beyond the outside walls of the laminar structure, i.e. into open space, typically atmospheric pressure. The sealing diaphragm 208 does not extend out into that area.

The pivotable operator 204 is a force-balance device; that is, the torques about the pivot axis 210 are maintained in balance by negative feedback action. The feedback signals are developed basically by a pneumatic position-sensing nozzle 240 associated with the external operator segment 214 and connected through output conduit 106 and a restrictor 242 to the usual air supply source, e.g. at 20 psi. In essence, the nozzle 240 detects any unbalance in the total torque about axis 210 resulting from differences between the measurement and set pressures applied to opposite sides of the right-hand operator segment 216 (in the respective pressure chambers 222, 224), and between the pressures applied to opposite sides of the lower operator segment 212 (in the respective pressure chambers 218, 220). As noted above, the set pressure signal is derived from the primary controller, as the so-called "intermediate output signal" of the cascade control system, while the measurement pressure signal is derived from a conventional measuring instrument 104. The pressures in chambers 218, 220 are controlled by pneumatic feedback circuits, to be described, responsive to the position-sensing nozzle 240.

The back-pressure of position-sensing nozzle 240 is directed through conduit 106 to the output relay 108 to produce a corresponding relay signal which serves to activate feedback circuits mentioned above and also serves as the final automatic control signal of the control system, providing valve positions appropriate for maintaining the secondary measurement and set signals equal. When the process is stabilized with measurement and set pressures equal, the torques on the pivotable operator 204 will be balanced with the operator positioned such that the nozzle back-pressure will produce the correct control signal for maintaining the valve position.

If the secondary measurement and set signals become unequal, the resulting pressure differential between the opposite surfaces of the upper operator segment 216 will develop a torque about the pivot axis 210. This torque will tend to rotate the pivotable operator, causing corresponding movement of both the lower tongue 212 and the external segment 214. That is, all of the tongue segments are integral and thus move together about the pivot axis. Consequently, the back-pressure of nozzle 240 will change, so as to alter correspondingly the output pressure from the output relay 108.

This relay output pressure is conducted through a spool valve 250 (the function of which pertains primarily to the automatic-to-manual transfer arrangements to be discussed below) to a negative feedback conduit 252 leading to the pressure chamber 220 behind the lower tongue 212. This negative feedback circuit serves to maintain the net torques on the pivoted operator 204 in balance. When the torque is momentarily unbalanced by a change in measurement or set pressures, the resulting change in relay output pressure produces a corresponding change in the feedback pressure in chamber 220 just sufficient to counteract the initial torque unbalance. When balanced conditions are restored, the new output pressure from relay 108 represents the secondary controller output signal for appropriately readjusting the process valve to bring the measurement signal into equality with the set signal.

This secondary controller 14 also includes means for developing a reset function in its output signal. In effect, the control action (opening or closing of the valve) is gradually augmented in response to a persistent deviation between measurement and set signals. This reset is produced by a positive feedback circuit wherein the relay output pressure is conducted through spool-valve 250 and a positive feedback conduit 254 to a variable pneumatic reset restrictor 256. (This restrictor is illustrated as part of a dual restrictor assembly 255, and is presented in the form of a so-called "-scratch" restrictor of known design which will be referred to in somewhat more detail hereinbelow.) From the output 256A of the reset restrictor 256, the reset circuit continues through a relatively large-capacity tank or "volume" 257 and a damping restrictor 258 to the lower pressure chamber 228 behind the hinged element 206.

This hinged element 206 is utilized primarily for pneumatic isolation, and serves as a one-to-one (1:1) repeater to produce in the front chamber 226 a pressure equal to the reset pressure in chamber 228. For this purpose, the front chamber 226 is connected through a fixed restrictor 260 to a supply of air under pressure (e.g. 20 psi), and a vent nozzle 262 is mounted in the chamber adjacent element 206 so as to adjust the degree of vent restriction in accordance with the position of the element. If the pressure in the front chamber 226 becomes unequal to the reset pressure in the rear chamber 228, the element 206 will be moved by the resulting pressure differential so as to alter the effective restriction presented by the vent nozzle, and thereby restore balanced pressure conditions. Thus the pressure in chamber 226 will be maintained equal to the reset pressure in the opposite chamber 228.

The repeated reset pressure is coupled from chamber 226 through a pressure-dropping restrictor 270 (the function of which will be described later) and a damping restrictor 272 to the pressure chamber 218 in front of the lower tongue 212 of the pivotable operator 204. The pressure in chamber 218 tends to counteract or reduce the negative feedback torque produced by the pressure in the rear chamber 220, and thus can be considered as providing a degree of "positive" feedback. The dynamics of the positive feedback action depends, as in conventional pneumatic reset circuits, on the setting of the reset restrictor 256, as well as on the magnitudes of other fixed parameters of the reset circuit. At all times, however, the torques on the pivotable operator 204 are maintained in balance by the negative feedback action from the sensing nozzle 240.

A process controller should for most applications have means for altering its so-called "proportioning band." That is, there should be means for adjusting the amount of change in the final control signal (excluding time-variant rate or reset effects) for a given change in deviation between measurement and set. In conventional force-balance pneumatic controllers, this adjustment typically is accomplished by changing the effective location of the pivot point of the force-balance beam. However, with controllers based on planar pneumatic technology, such as illustrated by the secondary controller 14 herein, such an adjustment of the pivot point position is not truly practical, due to the nature of the laminar sandwich construction of a planar device. Thus, providing a suitable adjustment of the proportioning band has posed a serious problem.

This problem has been solved in accordance with one aspect of the present invention by employing a variable pneumatic restrictor to control the degree of response of the controller to a given change in deviation signal. In the preferred embodiment, this proportioning restrictor is incorporated in a circuit leading from the output relay pressure to the positive feedback pressure chamber 218, and serves in effect to control the degree of positive feedback counteraction opposing the negative feedback pressure in the negative feedback pressure chamber 220. That is, this proportioning positive feedback effectively cancels a proportion of the negative feedback torque in accordance with the setting of the proportioning restrictor.

More specifically, the dual restrictor assembly 255 includes a second adjustable "scratch restrictor" 280 which is connected, by a conduit 282, between the relay output pressure and the fixed pressure-dropping restrictor 270 leading to the repeater output chamber 226. Thus this second restrictor 280 is effectively in series with the fixed restrictor 270, and the two together serve functionally as a pressure-dividing network, providing at the juncture 284 between the two restrictors a pressure having a magnitude somewhere between the magnitude of the output and reset pressures. The actual magnitude of this positive feedback pressure is a function of the ratio of the fixed and variable reset restrictors 270 and 280. This positive feedback pressure is directed through the damping restrictor 272 to the positive feedback chamber 218. Thus it will be evident that the degree of "proportioning" action is controlled by the setting of the adjustable restrictor 280.

To summarize, the net amount of positive feedback tending to counteract or cancel out the negative feedback in chamber 220 will be determined, in part, by the setting of the second scratch resistor 280. The result is that an adjustment of the setting of that restrictor varies the effective amount of negative feedback, and thereby determines the magnitude of the output pressure from the relay 108 for a given deviation between the secondary measurement and set pressures. In that manner, the adjustable restrictor 280 serves to set the proportioning band of the controller 14.

Advantageously, the fixed pneumatic restrictors associated with the planar pneumatic controller 14 are small holes formed in the flexure assembly 200. Thus, in FIGS. 3C, 3D and 3E, aligned holes are shown as providing the restrictors identified with the reference numbers used in other portions of this specification. The manner in which such restrictor holes are connected into the associated pneumatic circuits is as described in U.S. Pat. No. 3,593,734. Also in accordance with that patented technology, use is made of pneumatic passages formed in the laminar sandwich castings, shown in FIGS. 3A and 3G, for purposes of effecting desired interconnections as outlined in the circuit diagram of FIGS. 2A, 2B and 2C. The casting of FIG. 3A also is formed with an enlarged portion 257A to serve as the reset volume 257 associated with the adjustable scratch resistor 256 for setting the degree of reset action.

The restrictor assembly 255 (FIG. 2C) comprises a pair of plastic discs 290A, 290B each having a tapered groove 292A, 292B formed on one face which is pressed against a Teflon sealing plate 294 containing outlet openings 256A, 280A aligned with the corresponding groove. The rotational position of each of the discs is individually controllable by manually operable means (not shown) so as to permit altering the relative positioning of the tapered groove with respect to the outlet opening. Each disc also is formed at the large end of its tapered groove with a corresponding passage 296A, 296B which connects through to the interior 298 of the restrictor assembly chamber. This chamber interior is pressurized by the output pressure from the relay 108. As either disc is rotated, there is a corresponding change in the length of the tapered groove through which the output air pressure must pass to reach the corresponding outlet opening. By these means, the amount of restriction or pneumatic impedance placed in the path of the corresponding air flow can be varied, so as to alter the proportioning band or the reset of the controller.

BUMPLESS TRANSFER BETWEEN MANUAL AND AUTOMATIC

In accordance with another aspect of the present invention the control apparatus includes means for transferring between manual operation and automatic operation in a "bumpless" fashion (i.e. without upsetting the process), and without requiring any balancing or other procedure to prepare the system for transfer. When in manual mode, the pneumatic valve signal is produced by a manual unit 300 (FIG. 2A) physically located beneath the instrument casing 10 (FIG. 1). This manual unit is of known construction, as shown for example in U.S. Pat. No. 3,525,351. The manual unit 300 includes a main transfer switch in the form of a rotary valve 302, operated from the front panel of the instrument by a lever 304 having automatic and manual positions as indicated by the labels in FIG. 1.

When the system is in automatic mode (with the primary and secondary controllers operating as described previously), the manual unit 300 "tracks" the automatic signal from output relay 108, and continuously adjusts the positioning of a manual signal control lever 306 to correspond with the actual automatic output signal. Thus, when the system is switched from automatic to manual (where the ports of the transfer valve 302 will be aligned as shown in dotted outline in FIG. 2A), the manual signal produced by unit 300 will be equal (within appropriate tolerances) to the previously existing automatic output signal. This manual signal is directed through a conduit 308 to the valve 110, in place of the automatic output signal produced by relay 108. The magnitude of the manual signal can thereafter be altered at will by rotating a thumb wheel 310 one edge of which extends through the front panel of the instrument 10 (FIG. 1), and which is shifted into driving engagement with the arc element 312 of lever 306 when the transfer switch 302 is rotated to manual position.

When the transfer switch 302 has been placed in its manual position, it sends an air pressure switching signal (e.g. 20 psi) out through a conduit 320 to operate various switching elements, now to be described, so as to prepare the control system for transfer back to automatic mode in a bumpless, balanceless fashion. One such switching element is the on-off switch 94 previously referred to. This switch is of conventional construction including a flexible diaphragm 324 shiftable by the pressure of the pneumatic switching signal into a position shutting off communication between the two ports 326, 328. When so actuated by the switching signal, in manual mode, this switch 94 closes off the reset feedback circuit of the primary controller 12. Thus, when in manual mode the reset pressure in reset bellows 98 will not varied in correspondence with the output pressure from the primary controller, but instead (as will be explained) is adjusted in response to changes in the secondary measurement signal in such fashion as to maintain the primary controller output pressure equal to the secondary measurement pressure.

The switching signal from conduit 320 also actuates the spool valve 250 to its right-hand position, illustrated in light outline. In that position, the spool valve interrupts the connection between the output relay 108 and the process valve 110, while continuing the connection from the output relay to the negative feedback chamber 220 of the secondary controller 14. Also, in the right-hand (manual mode) position, the spool valve interrupts an air supply connection to a conduit 340 leading to two conventional diaphragm-type pneumatic switches 342 (FIG. 2B) and 344 (FIG. 2C). In the preceding automatic mode condition, these switches were maintained closed by the effect of the air supply pressure on the corresponding diaphragms, but when the supply air is interrupted, in manual mode, these switches are opened.

CONDITIONING OF PRIMARY CONTROLLER IN MANUAL MODE

The first pneumatic switch 342, when opened at transfer to manual mode, completes a direct connection between the primary controller reset bellows 98 (FIG. 2A) and the output chamber 346 of a force-balance planar transfer unit 348 of known construction (see, for example, the above-mentioned U.S. Pat. No. 3,590,694. This transfer unit includes a pivotable operator 350 arranged to compare continuously the secondary measurement signal pressure, in one upper input chamber 352, with the primary controller output signal pressure, in the other upper input chamber 354. These signal pressures are conducted to the corresponding chambers by respective conduits 356, 358. The transfer unit is activated in manual mode by the supply air pressure which also actuates the spool valve 250.

If, now, the primary controller output pressure directed to transfer unit chamber 354 becomes unequal to the secondary measurement pressure directed to the opposing chamber 352, the output of the transfer unit, from its chamber 346, correspondingly changes to readjust the pressure in the primary controller reset bellows 98 (FIG. 2A) to force the primary controller output pressure into equality with the secondary measurement signal. This readjustment is effected by negative feedback action initiated by the transfer unit vent nozzle 360 which senses any slight change in positioning of the operator 350 resulting from an inequality between the pressures in opposed input chambers 352, 354.

More specifically, the chamber 362 in which this vent nozzle 360 is located is supplied with air through a restrictor 364 so that any change in vent nozzle air flow due to a change in position of operator 350 correspondingly alters the pressure in chamber 362 to tend to maintain the net torques on operator 350 in balance. This vent chamber 362 is connected through a restrictor 366 to the transfer unit output chamber 346, and also to the primary controller reset tank 97 and reset bellows 98. The combination of restrictor 366 and reset tank 97 produces an effective integrating action of the air pressure signal developed in chamber 362, while the nozzle 360 continues to adjust the pressure in chamber 362 such that the net torques on operator 350 remain in balance. This integrating action provides appropriate stability for the negative feedback circuit now to be described.

The change in the transfer unit output pressure (chamber 346) transmitted to the reset bellows 98 tends to unbalance the primary force beam 66. This, in turn, causes the primary sensing nozzle 76 correspondingly to readjust the output pressure of the primary controller, and thereby alter the pressure in the transfer unit input chamber 354. This change in pressure is in a direction tending to restore equality with the secondary measurement pressure in the opposing transfer unit chamber 352. Thus, the overall circuit provides negative feedback action which continuously maintains the primary controller output pressure equal to the secondary measurement signal.

CONDITIONING OF SECONDARY CONTROLLER IN MANUAL MODE

The second pneumatic switch 344 (FIG. 2C), referred to above, is opened by the air pressure signal from conduit 340 upon transfer to manual mode by transfer switch 302. Opening of this switch completes a connection from the secondary controller output conduit 254 to the secondary reset volume 257, and thence to the reset pressure chamber 228. This connection thus effectively by-passes the reset restrictor 256. (Although this by-pass connection includes a damping restrictor 380, its restrictive effect is essentially negligible relative to the reset restrictor 256.) Accordingly, the reset pressure in chamber 228, and in the adjacent repeater chamber 226, is maintained equal to the manually-set pressure being transmitted to the process valve 110. Since only a damping restrictor 380 is in the by-pass circuit, the reset pressure will follow closely any changes in manual pressure.

The manually-set valve pressure present in conduit 254 also is directed through the proportioning restrictor 280 to the pressure-divider restrictor 270 leading to the repeater chamber 226. Since the pressure in the repeater chamber is equal to the manually-set valve pressure, it will be evident that the pressure at restrictor juncture 284, and thus the pressure in the positive feedback chamber 218, necessarily will be maintained equal to the manually-set valve pressure. The proportioning restrictor 280 will not prevent this pressure from closely following the manually-set pressure, because the proportioning restrictor has a substantial air-flow capacity, significantly greater than that of the reset restrictor 256.

As noted previously, the output pressure of the primary controller 12 (conduit 100) is continuously maintained equal to the secondary measurement pressure (conduit 102). Thus, the pressures in the opposed input chambers 222 and 224 of the secondary controller will necessarily be equal, so that no net torque is applied to the pivotable operator 204 by these chambers. Accordingly, the feedback action of the sensing nozzle 240 adjusts the pressure in the negative feedback chamber 220 to be equal to the pressure in the positive feedback chamber 218, which in turn is equal to the reset pressure in the repeater chambers 226, 228.

In effect, the secondary controller 12 is maintained in completely balanced state, with its measurement and set pressures equal, and its reset and output pressures both equal to the manually-set valve pressure. Thus, when the system is switched back to automatic mode, there will be no immediate change in the pressure fed to the process valve 110, so that the transfer will be bumpless. The secondary controller will not introduce any upset immediately thereafter, because its measurement and set inputs 100, 102 are equal, due to conditioning of the primary controller 12, discussed in detail hereinabove. Of course, subsequently the control system will take over automatic control of the process, and, if there is any deviation between the primary measurement and set signals (as there is likely to be), the cascaded controllers will bring the measured variable to its desired set point. This control action will be smooth, because the primary controller reset pressure is at the proper level for the conditions then existing, and the dynamic response will be determined in the usual fashion by the controller parameters (proportioning, rate and reset) which have been preset in accordance with the particular process being controlled.

TRANSFER FROM CASCADE TO SECONDARY CONTROL

At times, e.g. for maintenance and adjustment purposes, it may be desirable to transfer the process from full cascade automatic control to control only by the secondary controller 14. To effect such transfer, the control system first is switched to full manual control, as described above, by actuation of transfer switch 302 (FIG. 2A) to its manual position. Thus the process valve 110 is controllable only by the manual unit 300 and is unaffected by any manipulations of the remainder of the control apparatus.

With the process under manual control, the secondary transfer switch 86 is actuated to its secondary position (shown in light outline), by rotation of rod 400 which is connected to a lever (not shown) accessible from the side of the instrument when the instrument has been partially withdrawn from its mounting panel. With switch 86 in its secondary position, the primary set pressure from conduit 73 is transmitted through to conduit 88 and thence to the secondary set point conduit 100 leading to the secondary controller 14. The primary set point pressure then is adjusted, by front panel knob 24, until the set pointer 18 matches the secondary measurement pointer 22.

Now the system is conditioned for smooth transfer to secondary control by returning the transfer switch 302 to automatic position. The secondary controller will thereupon pick up automatic control of the process valve 110, in the manner explained hereinabove, but with its set point controllable by knob 24 rather than by operation of the primary controller 12.

(It may be noted that after the system first is switched to manual mode, the order in which the subsequent steps are taken is not important, since the process valve is isolated from the automatic control apparatus, and is adjustable only by the manual unit 300. This is a safety feature, avoiding the possibility of process damage through operator error.)

To return from secondary control to full cascade control, the above-described procedure is simply reversed. That is, transfer switch 302 first is placed in manual position to isolate the process valve from the control apparatus. Then the set point knob 24 is adjusted to bring the set pointer 18 to the desired primary set point, and the secondary transfer switch 86 is returned to its normal cascade position (as shown). The various conditioning circuits described hereinabove thus become operative to prepare both the primary and secondary controllers for bumpless, balanceless return to cascade control. Accordingly, when the transfer switch 302 is returned to automatic position, the system is brought smoothly back to full cascade control without upsetting the process.

CONSTRUCTION DETAILS OF THE SECONDARY CONTROLLER

FIGS. 3A through 3I provide perspective views of the laminar sections which are combined in a sandwich construction to form the secondary controller 14. The central portion is the flexure assembly 200 which provides the pivotable operator 204. This flexure assembly is similar to the operator shown in the above-identified U.S. Pat. No. 3,590,694, and comprises the two outer sections 202A, 202B of thin springy metal, adhesively secured (as by epoxy) to corresponding sides of the mating rubber sealing diaphragm 208. Adjacent opposite sides of the flexure assembly 200 are respective sealing gaskets 410, 412.

These gaskets 410, 412 furnish required pressure sealing for the top casting 414, on one side, and the base sandwich 416 on the other side. This base sandwich comprises a chamber casting 418 adhesively secured to a thin cover plate 420 which serves to seal various pneumatic passages formed in the remote side of the chamber casting to define pressure conduits somewhat in the fashion that such pressure conduits are formed in the pneumatic computing apparatus disclosed in U.S. Pat. No. 3,371,862 issued to H. L. Bowditch et al. The closed passages formed in the base sandwich 416 provide various interconnections for the pneumatic circuit of the secondary controller, described hereinabove with reference to FIG. 2C, and including passages leading to the numerous small holes in the flexure assembly which serve to provide predetermined restrictions in selected pneumatic flow paths.

The final section of the laminar sandwich construction is a relatively rigid base plate 422 provided with access openings to make connections between the secondary controller 14 and other elements of the cascade control system, in accordance with the circuit diagram of FIGS. 2A, 2B, 2C, previously described. These access openings incorporate rubber O-rings inserted therein to seal the connections between the controller 14 and the pneumatic circuit board (not shown herein in detail) to which this controller 14 is secured, in accordance with the techniques described in co-pending application Ser. No. 864,108, filed on Oct. 6, 1969, by Hoel L. Bowditch, now U.S. Pat. No. 3,631,881.

This planar construction of the secondary controller 14 provides quite high sensitivity to input signals, and makes it possible to operate the controller with a low powered set point signal taken directly from the aspirator nozzle 76 of the primary controller 12. Thus, it is unnecessary to use a pneumatic relay, or the equivalent, to boost the power of the set point signal developed by the primary controller.

Although a specific preferred embodiment of the invention has been described in detail, it will be apparent that various modifications can be made. For example, when the system is on manual operation, the secondary reset pressure can be maintained equal to the manual valve signal by the use of a comparison servo arrangement incorporating a planar transfer unit, i.e. by an arrangement similar to that used to maintain the primary reset pressure equal to the secondary measurement pressure. For some applications, it may be advantageous to use such a planar transfer unit arrangement to compare the secondary output and manual signals, and to continuously adjust the primary reset pressure to maintain equality between the compared signals.

I claim:

1. In a cascade process control system of the type including a primary controller arranged to receive both primary measurement and primary set point signals and to provide an intermediate output signal to serve as a set point signal for a secondary controller arranged to receive a secondary measurement signal for comparison with the secondary set point signal, said secondary controller serving to provide an automatic control signal to adjust the setting of a process operator element such as a valve or the like so as to maintain the primary measurement at its set point value, and wherein the system is transferable between automatic and independent (e.g. manual) control modes and for that purpose includes a selectively activatable means operable in independent mode for producing a separate signal, in the form of a manual signal or the like, for controlling the process operator element in place of said automatic control signal;

that improvement in said control system for effecting bumpless, balanceless transfer from independent mode to automatic mode which comprises, in combination:

transfer switch means selectively operable into automatic or independent status and serving in independent status to:

1. direct to said process operator element a control signal corresponding to said separate signal;
2. maintain said secondary controller functioning to produce an automatic output signal corresponding to said separate independent signal;
3. maintain said primary controller functioning, with a constant set point, to produce an intermediate output signal corresponding to the secondary measurement signal;

said transfer switch means serving when switched back to automatic status to:

1. direct to the process operator element a control signal corresponding to said automatic output signal produced by said secondary controller (which automatic output signal had during the preceding independent mode been maintained equal to said separate signal whereby the process operator element will remain unaffected at the instant of switchback to automatic mode); and
2. release said primary controller from the effective influence of said secondary measurement signal and return it to normal operation under the influence of said primary measurement and set signal, whereby the primary controller will not alter the functioning of the secondary controller so as to upset the process but will, after switchback to automatic, readjust the set point of the secondary controller to whatever extent is required for the purpose of automatically controlling the primary process condition to its set value.

2. Apparatus as claimed in claim 1, wherein said selectively activatable means comprises a manual signal unit having means for manually controlling the magnitude of a signal for the process operator element.

3. Apparatus as claimed in claim 1, wherein said primary controller includes a reset element to produce reset action in the intermediate output signal; and adjusting means operable in independent mode responsive to said secondary measurement signal for adjusting the activation of said reset element to maintain said intermediate output signal equal to said secondary measurement signal.

4. Apparatus as claimed in claim 3, wherein said primary and secondary controllers are of the pneumatic force-balance type;

said reset element comprising a pressure-responsive element arranged to apply a force to the balanceable device of the controller in accordance with the pressure developed in said reset element by said adjusting means.

5. Apparatus as claimed in claim 4, wherein said adjusting means comprises a pneumatic force-balance transfer unit adapted to receive and compare pressure signals corresponding to the secondary measurement signal and said intermediate output signal, respectively, and to produce a controlling pressure signal for said reset element of such a magnitude as to a maintain equal said secondary measurement signal and said intermediate output signal.

6. Apparatus as claimed in claim 5, wherein said transfer unit comprises a planar element pivoted at an intermediate point and supplied on opposite surface on one side of said pivot point with pressures corresponding to said secondary measurement signal and said intermediate output signal.

7. Apparatus as claimed in claim 1, wherein said secondary controller includes an activatable reset element to introduce reset action in the output signal from the secondary controller; and adjusting means operable in independent mode and responsive to said separate signal for adjusting the activation of said reset element so as to maintain the output signal equal to said separate signal.

8. Apparatus as claimed in claim 7, wherein said secondary controller is of the pneumatic force-balance type;

said reset element comprising a pressure chamber adapted to receive a pressure signal to be applied to the force-balanceable element of the controller in accordance with the separate signal directed to said process operator element.

9. Apparatus as claimed in claim 8, wherein said secondary controller comprises a laminar sandwich structure including a pivotally mounted planar element serving as said force-balanceable element;

said sandwich structure including walls defining pressure chambers adjacent respective sections of said planar element;

means to supply secondary measurement and secondary set pressure signals to two of said chambers to produce oppositely-directed torques on said planar element about its pivot axis;

a position detector associated with said planar element to detect small changes in the position thereof responsive to unbalance in forces thereon about said pivot axis; and means controlled by said detector for adjusting the pressure in at least a third chamber so as to maintain the torque, on said planar element in balance.

10. Apparatus as claimed in claim 9, wherein said planar element comprises at least two separate segments on the same side of said pivot axis, each of said segments being movable together about said axis in response to any unbalance in torques about said axis.

11. Apparatus as claimed in claim 10, wherein said sandwich walls define a pressure chamber adjacent one of said segments and separate from the other segment, whereby said one segment is individually activatable in accordance with a respective pressure.

12. Apparatus as claimed in claim 11, including a seal along the pivot axis to provide for independent pressures on opposite sides of the pivot axis, said planar element extending through said seal and being pivoted about said axis while maintaining the pressure integrity on opposite sides thereof.

13. Apparatus as claimed in claim 12, wherein said position detector comprises a pneumatic nozzle mounted adjacent said other segment to sense changes in the pivotal position of said planar element about said axis.

14. Apparatus as claimed in claim 13, wherein said other segment extends out through said seal and beyond the exterior wall of said sandwich structure, whereby said other segment and said nozzle are located in atmospheric pressure at all times.

15. Apparatus as claimed in claim 9, including further means controlled by said detector for adjusting the pressure in a fourth chamber in response to changes in the pivotal position of said planar element.

16. Apparatus as claimed in claim 15, wherein said further means includes means to alter the pressure in said fourth chamber in such a manner as to introduce reset action in the output signal of said secondary controller.

17. Apparatus as claimed in claim 16, wherein said reset introducing means includes an adjustable restrictor in the pressure line leading to said fourth chamber.

18. Apparatus as claimed in claim 17, wherein said first two chambers are located adjacent respective opposite surfaces of said planar element which are on one side of said pivot axis; and said other two chambers are located adjacent respective opposite surfaces of said planar element which are on the other side of said axis;

said planar element being formed with an additional segment which moves with the planar element about its pivot axis;

said additional segment being remote from any of said four pressure chambers so as not to be directly affected by the pressures therein; and a position detector adjacent said additional segment to sense any unbalance in forces about said pivot axis.

19. Apparatus as claimed in claim 8, wherein said adjusting means includes a non-restrictive conduit of relatively large flow capacity for directing a pressure signal to said reset pressure chamber corresponding to the signal being sent to the process operator element.

20. Apparatus as claimed in claim 19, wherein said transfer switch means includes a pneumatically-operated switch for opening said non-restrictive conduit when the system is conditioned for non-automatic (independent) mode of operation.

21. In a cascade process control system of the type including a primary controller arranged to receive primary measurement and set point signals and to provide an intermediate output signal to serve as a set point signal for a secondary controller arranged to receive a secondary measurement signal for comparison with the secondary set point signal, said secondary controller serving to provide an automatic control signal to adjust the setting of a process operator element such as a valve or the like so as to maintain the primary measurement at its set point value, and wherein the system is transferable between automatic and independent (e.g. manual) control modes and for that purpose includes a selectively activatable means for producing a separate signal, in the form of a manual signal or the like, for controlling the process operator element in place of said automatic control signal;

the method of conditioning the control system to prepare it for bumpless, balanceless transfer from independent mode to automatic mode which comprises the steps of:

maintaining the automatic output signal of said secondary controller equal to said separate signal; and maintaining the intermediate output signal of said primary controller equal to the secondary measurement signal without altering the primary set point.

22. The method of claim 21, wherein said primary controller is of the reset type;

said intermediate output signal being maintained equal to said secondary measurement signal by adjusting the reset signal of said primary controller.

23. The method of claim 21, wherein said secondary controller is of the reset type;

said automatic output signal being maintained equal to said separate signal by adjusting the level of the reset signal in said secondary controller.

24. The method of claim 23, wherein the reset signal in said secondary controller is maintained equal to the separate signal, and the measurement and set signals of said secondary controller are maintained equal.

25. The method of claim 24, wherein said primary controller is of the reset type;

said intermediate output signal and said secondary set point signal being maintained equal to said secondary measurement signal by adjusting the level of reset activation in said primary controller.

26. The method of claim 21, wherein during automatic mode, said separate signal is maintained equal to said automatic output signal to provide for bumpless, balanceless transfer to independent mode.

* * * * *